(12) United States Patent
Munch-Fals et al.

(10) Patent No.: US 10,690,162 B2
(45) Date of Patent: Jun. 23, 2020

(54) RELEASABLE CLIP FOR A KNOCK-DOWN STRUCTURE

(71) Applicant: Clip-Lok International Limited, Tortola (VG)

(72) Inventors: Jakob Munch-Fals, Gentofte (DK); Monel Solomon, Hod Hasharon (IL)

(73) Assignee: Clip-Lok International Limited, Tortola (VG)

( * ) Notice: Subject to any disclaimer, the term of this patent is extended or adjusted under 35 U.S.C. 154(b) by 266 days.

(21) Appl. No.: 14/916,334

(22) PCT Filed: Sep. 8, 2014

(86) PCT No.: PCT/IB2014/064312
§ 371 (c)(1),
(2) Date: Mar. 3, 2016

(87) PCT Pub. No.: WO2015/033314
PCT Pub. Date: Mar. 12, 2015

(65) Prior Publication Data
US 2016/0195118 A1    Jul. 7, 2016

(30) Foreign Application Priority Data
Sep. 6, 2013  (ZA) .................................. 2013/06713

(51) Int. Cl.
*F16B 5/06* (2006.01)
*F16B 2/24* (2006.01)
*B65D 6/26* (2006.01)

(52) U.S. Cl.
CPC .............. *F16B 5/0614* (2013.01); *B65D 9/24* (2013.01); *F16B 2/245* (2013.01); *F16B 5/0635* (2013.01)

(58) Field of Classification Search
CPC ...... F16B 5/0614; F16B 2/245; F16B 5/0635; B65D 9/24; B65D 45/24; B65D 19/16
See application file for complete search history.

(56) References Cited

U.S. PATENT DOCUMENTS

| 52,525 A | * | 2/1866 | Bunnell | ................. | B65D 45/24 |
| | | | | | 215/284 |
| 247,547 A | * | 9/1881 | Eiseman | ................. | B65D 45/24 |
| | | | | | 215/284 |

(Continued)

FOREIGN PATENT DOCUMENTS

| CH | 327953 | 3/1958 |
| DE | 202010017246 U1 | 6/2011 |

(Continued)

*Primary Examiner* — Robert Sandy
*Assistant Examiner* — Louis A Mercado
(74) *Attorney, Agent, or Firm* — The Webb Law Firm (57) ABSTRACT

A resilient metal clip is suitable for use in securing adjacent panels of a knock-down structure, for example a collapsible container, to one another. The resilient clip includes two legs that extend away from one another, the two legs being resiliently connected to one another at one end in order for the legs to be resiliently displaceable relative to one another. Each leg has a free end, with the free ends terminating in panel engagement formations. A disengagement member is displaceably connected to one of the legs, and is displaceable relative to the leg between a rest position in which it does not interfere with an engagement formation provided on the leg, and a release position in which at least part of the disengagement member exerts a release force on the engagement formation of the leg.

13 Claims, 5 Drawing Sheets

(56) References Cited

U.S. PATENT DOCUMENTS

| | | | | |
|---|---|---|---|---|
| 339,083 | A * | 3/1886 | Buchholz | B65D 45/24 |
| | | | | 215/284 |
| 1,163,576 | A * | 12/1915 | Werth | B65D 45/24 |
| | | | | 215/285 |
| 1,793,078 | A * | 2/1931 | Frye | B65D 45/24 |
| | | | | 292/246 |
| 4,024,977 | A | 5/1977 | Rowley | |
| 4,683,622 | A | 8/1987 | Oehlke | |
| 5,356,103 | A | 10/1994 | McClurg | |
| 5,535,909 | A | 7/1996 | Philip | |
| 6,389,658 | B1 | 5/2002 | Pfaller et al. | |
| 2003/0102310 | A1 | 6/2003 | Wincent | |
| 2013/0026165 | A1 | 1/2013 | Kvols et al. | |
| 2013/0183089 | A1 | 7/2013 | Podsadny et al. | |
| 2013/0315652 | A1 * | 11/2013 | Eding | B65D 9/24 |
| | | | | 403/20 |
| 2016/0215801 | A1 * | 7/2016 | Munch-Fals | F16B 2/245 |
| 2017/0120664 | A1 * | 5/2017 | Klein | F16B 45/02 |

FOREIGN PATENT DOCUMENTS

| | | | |
|---|---|---|---|
| DE | 102010035012 | A1 | 2/2012 |
| EP | 1050940 | A1 | 11/2000 |
| FR | 2779123 | A1 | 12/1999 |
| WO | 9221574 | A1 | 12/1992 |
| WO | 9513969 | A1 | 5/1995 |
| WO | 0168459 | A1 | 9/2001 |

* cited by examiner

RELEASABLE CLIP FOR A KNOCK-DOWN STRUCTURE

CROSS-REFERENCE TO RELATED APPLICATIONS

This application is the United States national phase of International Application Ser. No. PCT/IB2014/064312 filed Sep. 8, 2014, and claims priority to South African Patent Application No. 2013/06713 filed Sep. 6, 2013, the disclosures of which are hereby incorporated in their entirety by reference.

BACKGROUND TO THE INVENTION

The invention relates to a clip for a knock-down structure, and more particularly but not exclusively, to a resilient metal clip for use to secure adjacent panels of a collapsible container to one another.

Containers, such as crates and boxes, (in this specification the terms will be used interchangeably) are widely used for the transportation of goods in many different industries, whilst utilizing many different modes of transportation. When carrying heavy loads, boxes are often made from wood, for example in the form of wooden sheets in the form of planks or plywood panels, which are secured to one another by means of nails, screws and tightening bands so as to form an enclosed volume Most containers are for single use only and are discarded after the transported goods have reached their destination. This procedure is increasingly coming under pressure due to financial, environmental and safety reasons. Disassembly, reuse, removal, destruction and processing of used containers pose a number of risks for users of the containers. People can, for example, be injured in the process of disassembling a box if the box was not designed and constructed with the end goal of easy disassembly kept in mind. The processing of the materials for re-use is also time consuming and expensive, at least in part due to the fact that the constituent parts (i.e. wooden components and steel fasteners) need to be carefully separated as part of the recycling process. Furthermore, in industries where an end user receives a large number of goods and parts from suppliers, and where these products are delivered in plastic, metal or wooden containers, packaging materials can quickly pile up, which significantly increases the cost of handling and storage.

In recent times, the above concerns have led to the development and use of collapsible containers. These containers can easily be erected and assembled to form small or large containers, and this can typically be done by a single person without the use of nails, a hammer or other traditional tools and equipment associated with assembling wooden containers. Many of these wooden containers utilize a system of special clips, in which the clips are adapted securely, but releasably, to secure two adjacent wooden panels to one other. In this way, side walls of the container are connected to one other and to a base using a plurality of clips. A lid is then also securable to an opposing end of the interconnected sidewalls so as to form a complete transportation container which can be handled by a forklift.

In applications where a load to be carried by a container is significant, a clip-assembled container must still be of a design that ensures durability during all normal handling and transportation actions. This means that clips used to assemble the container must be sufficiently strong to withstand both the load carried by the box, as well as additional impact forces exerted on the clips when the box is exposed to external forces, for example when the box bounces, vibrates or are manhandled during loading, transportation and storage. Consequently the most common clips are typically made from high strength steel of 1-2 mm thickness and which are between 20 and 60 mm in width. Often clips are also heat treated to create flexible, strong spring clips.

At present, spring steel that is bent into a desired shape results in the simplest design, and therefore the lowest price in production, as only cutting, bending and surface treatment is necessary. As low complexity ensures correct function over time, producers are reluctant to introduce more complex clips where reliability may potentially be adversely affected by the increased complexity.

Figure 1:
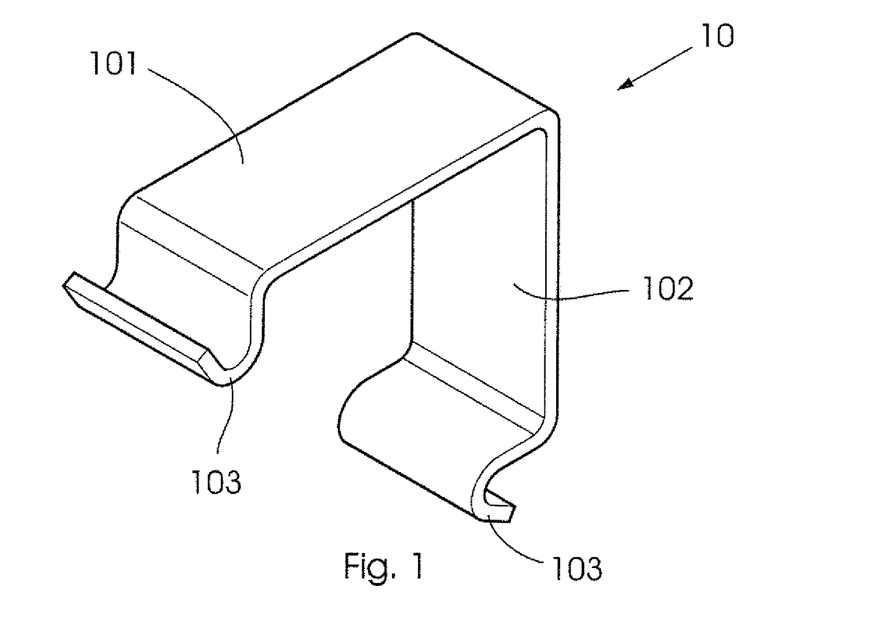
FIG. 1 is a perspective view of a prior art clip.
Figure 2:
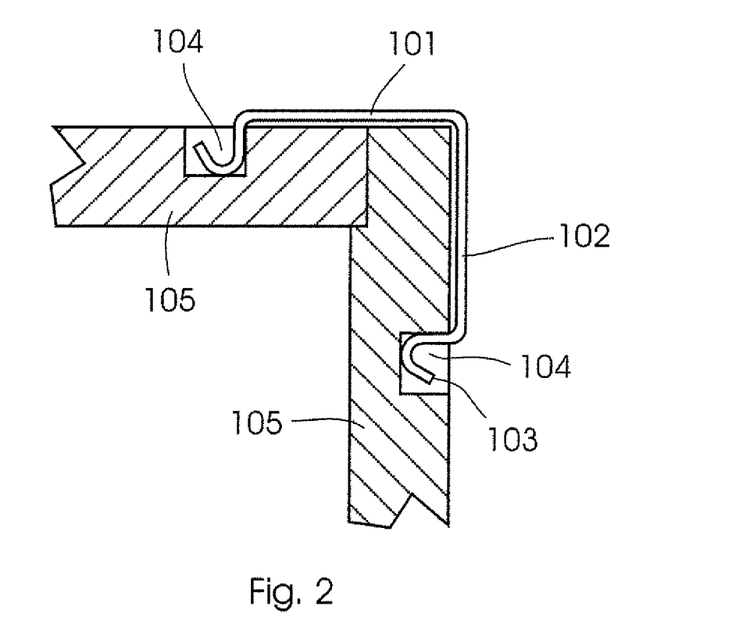
FIG. 2 is a cross-sectional side view of the clip of FIG. 1 in use.
Figure 3:
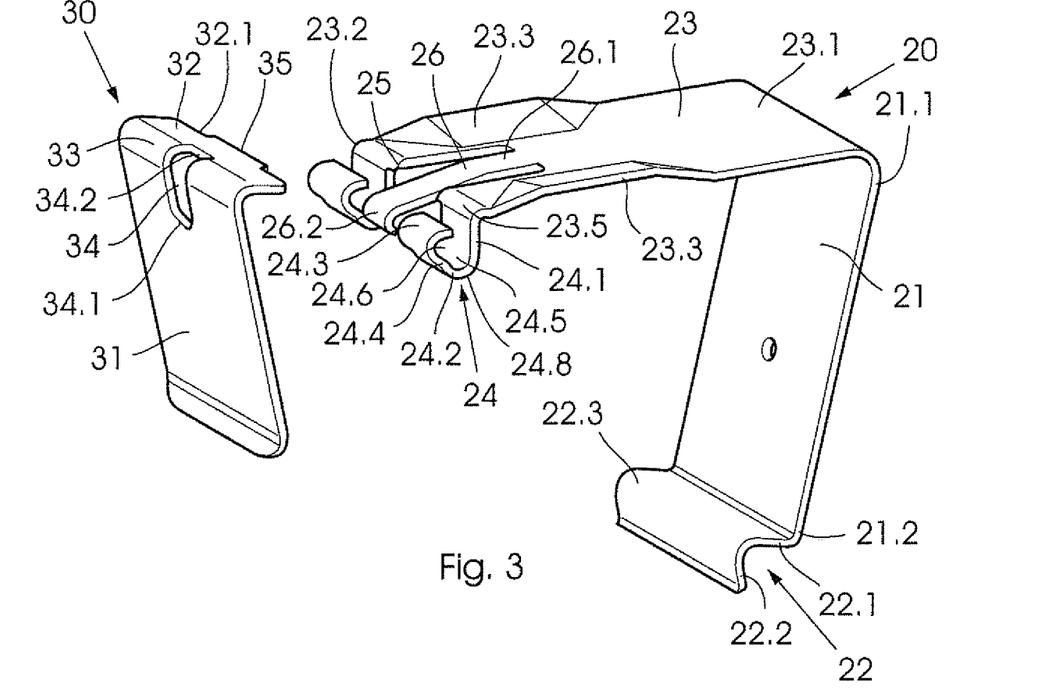
FIG. 3 is an exploded perspective view of a clip in accordance with one embodiment of the present invention.
Figure 4:
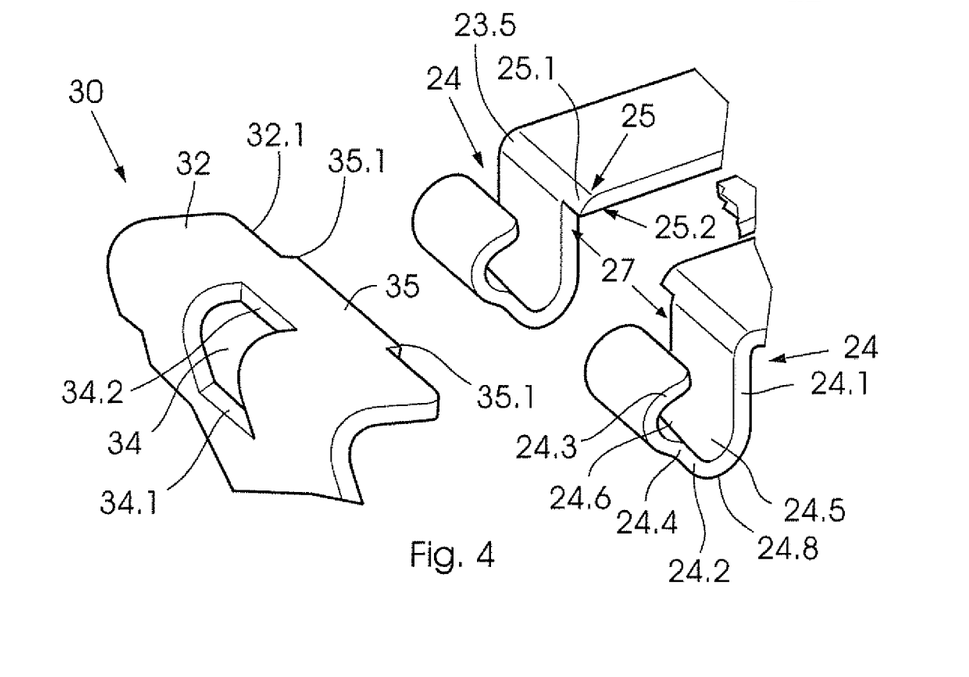
FIG. 4 is an enlarged view of part of the clip of FIG. 3, with a cantilever extension of the clip removed for clarity.
Figure 5:
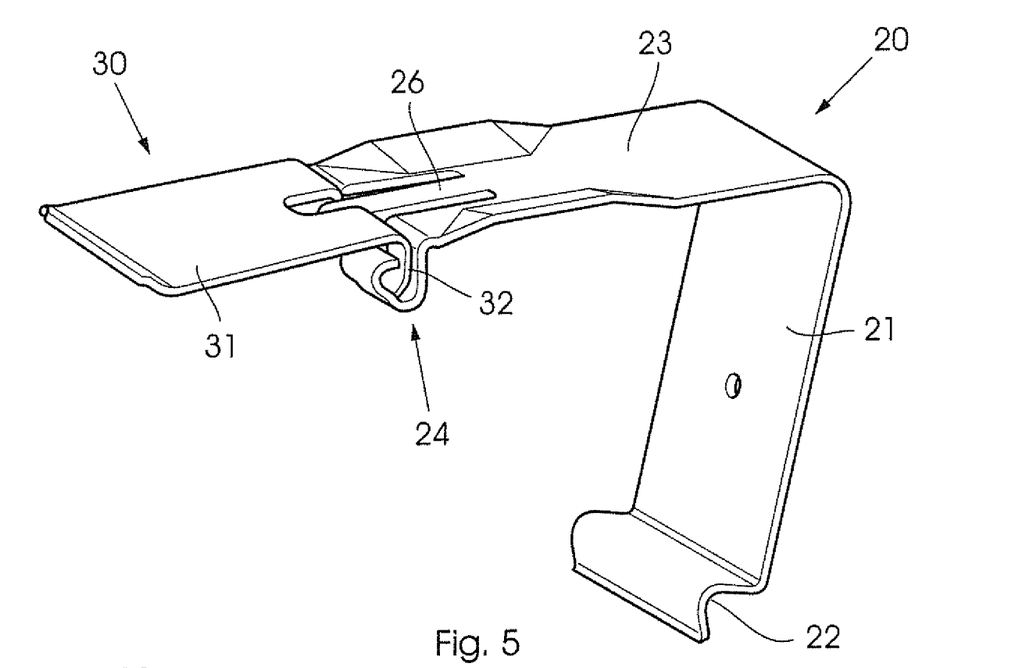
FIG. 5 is a perspective view of an assembled clip in accordance with the invention, with a disengagement member of the clip in a rest position.

In order to maximize the life of these collapsible containers, it is important for the wooden panels to be maintained in a good condition. In particular, it is important for connecting grooves provided in edge zones of the wooden panels to be protected against damage and wear. This can in part be achieved by proper clip design, wherein the design should preferably be such that no sharp edges of the clips engage the grooves provided in the wooden panels when clips are secured to the wooden panels. For this reason, most clips do not have sharp free ends that directly engage the wood, but instead terminate in bent, rounded ends that allow the clip to slide safely and with reduced friction over the fragile wooden surface and locking edges without sacrificing too much clamping force. A clip of this design is shown in FIGS. 1 and 2, which illustrates a clip 10 comprising a sheet of metal having been bent at a right angle in order to define two opposing legs (101 and 102). Each leg terminates in a rounded end 103 which in use engages slots 104, or securing grooves, provided in a wooden panel 105.

When assembled, the clips are exposed to various forces, including bending moments induced by the relative angular displacement between adjoining panels, and also shear forces resulting from relative transverse displacement of adjoining panels. This is not limited to gradual and constant loading, and additional impact loads may be exerted on the clips during handling and transportation of the box, where the box and content are subjected to impacts, shocks and vibration. The clips therefore have to be very strong, and have to exert a significant clamping force on the adjoining panels. It follows that the ends of the clips must securely engage the grooves provided in the panels. The secure engagement that is required brings about downstream challenges when it comes to the subsequent removal of the clips. Users are required to use a special tool in order to remove the ends of the clip from the grooves. If the tool is available, this does not constitute a significant problem. However, the special tools often get lost during transportation, or are displaced, and the removal of the clips then becomes problematic. Consequently, end users are then forced to turn to other implements in order to remove the clips, for example knives, screwdrivers, crowbars and the like. As these tools are not suited for the removal of the clips, they pose a severe injury risk to the end-user, over and above the loss of time and efficiency already mentioned above.

It is accordingly an object of the invention to provide a releasable clip for a knock-down structure, for example a collapsible container, which will, at least partially, alleviate the above disadvantages.

It is also an object of the invention to provide a releasable clip for a knock-down structure, for example a collapsible container, which will be a useful alternative to existing releasable clips.

It is a further object of the invention to provide a releasable clip for a knock-down structure, for example a collapsible container, with the releasable clip including a disengagement member that forms part of the clip, and which can be used to remove the clip from the collapsible container.

SUMMARY OF THE INVENTION

According to the invention there is provided a releasable clip, suitable for securing two panels of a knock-down structure to one another, the releasable clip including:
two legs extending away from one another, the two legs being resiliently connected to one another at one end in order for the legs to be resiliently displaceable relative to one another;
each leg having a free end, with the free ends terminating in panel engagement formations; and
a disengagement member which is displaceably connected to one of the legs, the disengagement member being displaceable relative to said leg between a rest position in which it does not interfere with an engagement formation provided on the leg, and a release position in which at least part of the disengagement member exerts a release force on the engagement formation of the leg.

There is provided for the disengagement member to be adapted to exert a release force on the engagement member when the disengagement member is displaced further away from the rest position while in the release position.

Preferably, the disengagement member defines a lever arrangement, in which a part of the leg to which it is connected forms a fulcrum, and wherein the engagement formation, which is engaged by at least part of the disengagement member, is the load displaced by the lever arrangement.

The disengagement member may be pivotably connected to the leg of the clip, and more particularly may be pivotably displaceable between the rest and release positions.

The disengagement member may include a handle section and an actuating section, with a pivot zone located between the handle section and the actuating section.

There is provided for the pivot zone of the disengagement member to abut a part of the leg to which it is connected when the disengagement member is in the release position.

Preferably, there is provided for the pivot zone of the disengagement member to abut a corner formed between the end of the leg and the engagement formation extending therefrom, when the disengagement member is in the release position.

A further feature of the invention provides for the disengagement member to be displaceable towards a stowage position, in which the disengagement member is positioned in an orientation substantially perpendicular to the leg to which it is connected.

There is provided for the engagement formation to be defined by the free end of the leg to which the disengagement member is connected having been formed into a continuous, arcuate gripping formation.

The gripping formation may include a first part that extends transversely from the leg, a second part that is bent at an acute angle relative to the first part of the gripping formation, and a third part which extends transversely from the second part of the gripping formation.

The third part of the gripping formation may define a lip formation that extends from the end of the second part of the gripping formation back towards the leg, in so doing partially extending across an open pocket formed by the first and second parts of the gripping formation.

A proximal zone of the second part of the gripping formation may be inwardly bent towards the pocket so as to divide the pocket into a first pocket and a second pocket.

The actuating section may extend transversely from the handle section, and in use may be located inside the engagement formation.

More particularly, there is provided for the actuating section to be located inside one of the pockets defined by the engagement formation.

There is further provided for an end of the actuating section to abut the lip formation when the disengagement member is in the release position, in order for further displacement of the disengagement member to result in the displacement of the lip formation, and hence the displacement of the engagement member.

The actuating section may be located inside the second pocket when in the release position, and may be located inside the first pocket when in the rest position.

There is provided for the handle section to be substantially parallel or co-planar with the second leg when the disengagement member is in the rest position.

There is provided for the handle section to extend transversely from the leg when the disengagement member is in the release position.

A further feature of the invention provides for a cantilever extension to be formed in the leg to which the disengagement member is connected.

A slot, configured and dimensioned for receiving the cantilevered extension, may be provided in the disengagement member, and more particularly in a pivot zone of the disengagement member.

There is provided for the cantilever extension to be resilient, and to exert a force onto the disengagement member when the disengagement member is in the rest, release or stowage positions.

Preferably, the cantilever extension is configured to exert a force onto an edge of the slot provided in the disengagement member.

The cantilever extension may extend from the center of the leg, with opposing parts of the engagement formation located on opposing sides of the cantilever extension.

There is provided for the cantilever extension to divide the engagement formation into two spaced apart, opposing engagement formations having a gap provided therebetween.

A flange may extend from the actuating section of the disengagement member, and may in use protrude into the gap between the two spaced apart engagement formations so as to prevent sideways movement of the disengagement member relative to the leg of the clip.

The flange may be co-planar relative to the actuating section of the disengagement member, but is only partially as wide as the actuating section from which it extends.

There is further provided for a shoulder formation to be provided on the second leg inside and adjacent the two spaced apart engagement members, and for the ends of the flange extending from the actuating section of the disengagement member to abut the shoulder formations when the disengagement member is displaced to the stowage position, so as to limit further displacement of the disengagement member.

A free end of the cantilever extension may terminate in a lip formation that extends transversely from the cantilever extension.

There is provided for a second engagement formation to be defined by the free end of the other leg having been formed into a continuous gripping formation.

The gripping formation may include a first part that extends transversely from the leg, and a second part that is bent at an angle relative to the first part of the gripping formation.

The engagement formation may be substantially V, U or C-shaped when viewed in cross-section.

There is provided for the legs of the clip to be integrally formed from a strip of an at least partially resilient material. Preferably, the legs are formed from a single metal strip.

The legs of the clip may be disposed at an angle relative to one another.

Preferably, the legs are transverse relative to one another. More preferably, the legs are orientated at an angle of between 70 and 100 degrees relative to one another.

According to a further aspect of the invention there is provided a collapsible container including:
at least two panels located adjacent one another, each panel including a securing groove provided in an edge zone thereof; and
a releasable clip, comprising:
two legs extending away from one another, the two legs being resiliently connected to one another at one end in order for the legs to be resiliently displaceable relative to one another;
each leg having a free end, with the free ends terminating in panel engagement formations suitable for engaging the securing grooves in the panels; and
a disengagement member which is displaceably connected to at least one of the legs, the disengagement member being displaceable relative to said leg between a rest position in which it does not interfere with an engagement formation provided on the leg, and a release position in which the disengagement member is arranged to be able to exert a release force on the engagement formation of the leg in order for the engagement formation to disengage the securing groove provided in the panel.

There is provided for the collapsible container to include a releasable clip as described above.

According to a further aspect of the invention there is provided a method of removing a releasable clip from a panel of a collapsible container, including the steps of:
providing a releasable clip including
two legs extending away from one another, the two legs being resiliently connected to one another at one end in order for the legs to be resiliently displaceable relative to one another; each leg having a free end, with the free ends terminating in panel engagement formations; and
a disengagement member which is displaceably connected to at least one of the legs, the disengagement member being displaceable relative to said leg between a rest position in which it does not interfere with an engagement formation provided on the leg, and a release position in which the disengagement member is arranged to be able to exert a release force on the engagement formation of the leg;
displacing the disengagement member until it exerts a release force on the engagement formation, in order for the engagement formation to disengage a securing groove provided in the panel of the collapsible container.

A further step of the method provides for the disengagement member first to be displaced from the rest position to the release position, in order for further displacement from the release position then results in a release force being exerted on the engagement formation.

BRIEF DESCRIPTION OF THE DRAWINGS

A preferred embodiment of the invention is described by way of a non-limiting example, and with reference to the accompanying drawings in which.

DETAILED DESCRIPTION OF INVENTION

Referring to FIGS. 3 to 10, in which like numerals indicate like features, a non-limiting example of a releasable clip for a collapsible container in accordance with the invention is generally indicated by reference numeral 10.

The releasable clip 10 comprises a clip body 20 and a disengagement member 30 that is pivotably connected to the clip body 20 so as to be displaceable between rest (FIGS. 5 and 8) release (FIGS. 6 and 9) and stowed (FIGS. 7 and 10) positions. In the context of the specification, the term 'connected' does not necessarily mean that the disengagement member is mechanically secured relative to the body of the clip, but does imply that the movement of the disengagement member relative to the body of the clip is at least partially constrained, and that the disengagement member is therefore operatively linked to the body of the clip.

In the embodiment shown in FIGS. 3 to 10, the clip body 20 is made from of a unitary sheet of a resilient material, for example spring steel, which has been bent into a substantially L-shaped structure so as to define a first leg 21 and a second leg 23. The first leg 21 and the second leg 23 are disposed at an acute angle relative to one another, but the angle may be different for different applications, and can vary from almost 180 degrees to an acute angle depending on the configuration of panels to be held together by the clip 10. The clip 10 as shown in the specific example is designed to secure panels at right angles relative to one another, but the same concept will also find application where the angles between the panels are less than 90 degrees, or exceed 90 degrees.

The first leg 21 of the clip body 20 includes a connected end 21.1, which is secured, or extends from, the second leg 23, and a free end 21.2. The free end 21.2 terminates in a first engagement formation 22, which is adapted in use to engage a complementary groove provided in an edge zone of a panel as is known in the art. The first engagement formation 22 is formed by the free end of the first leg having been formed into an arcuate structure that may be substantially U, V or C-shaped when viewed from the side. The first engagement formation 22 includes a first part 22.1 that extends transversely, and in this case substantially perpendicularly, from the first leg 21, and a second part 22.2 that extends from the first part 22.1 at an acute angle so as to form a jaw 22.3 that in use abuts an inner surface of a groove provided in the panel, similar to the prior art configuration of FIG. 2.

The second leg 23 of the clip body also includes a connected end 23.1, which is secured, or extends from, the first leg 21, and an opposing free end 23.2. Clip removal wings 23.3 are provided in a proximal zone of the second leg 23, and are provided for removing the clip using a customized external tool, as is known in the art.

Two spaced apart second engagement formations 24 are provided towards opposite edges of the second leg 23, with a resultant gap 27 formed between the two engagement formations 24. Each second engagement formation 24 is formed by the free end of the second leg 23 having been formed into an arcuate structure that may be partially triangular when viewed from the side. The second engagement formation 24 includes a first part 24.1 that extends transversely, and in this case substantially perpendicularly, from the second leg 23, a second part 24.2 that extends from the first part 24.1 at an acute angle so as to form a jaw 24.8 that in use abuts an inner surface of a groove provided in the panel, similar to the prior art configuration of FIG. 2. In addition, the second engagement formation 24 includes a third part 24.3 in the form of a lip formation which extends from an end of the second part 24.2 back toward the second leg 24. The lip formation 24.3 extends partially across a pocket defined by the first 24.1 and second 24.2 parts, and is furthermore substantially co-planar, or at least substantially parallel, to the first leg 24. An indentation 24.4 is formed in the second part 24.2 of the second engagement formation 24, and divides a pocket formed by the second engagement formation into a first pocket 24.5 and a second pocket 24.6. Each engagement formation 22, 24 has a protruding jaw 22.3, 24.8 extending inwardly from the terminal end of each leg 21, 23 and each jaw 22.3, 24.8 is adapted to engage an engagement slot 104 (FIG. 1) within one of the two panels 105 (FIG. 2).

A shoulder formation 25 is provided adjacent and inwardly from each of the two second engagement formations 24. Each shoulder formation includes a rounded upper surface 25.1 which follows the initial curvature of a transitional zone between the second leg 23 and the second engagement formation 24. The shoulder formations 25, however, do not extend along the first parts 24.2 of the second engagement formations 23, but rather terminate in flat abutment surfaces 25.2 which are co-planar with a bottom surface of the second leg 23.

A cantilever extension. 26 extends from the second leg 23 of the clip body 20, and is located between the two second engagement formations 24. The cantilever extension 26 includes a connection zone 26.1 that extends from the second leg 23, and a free end 26.2 that extends away from the second leg 23 in substantially the same plane as the second leg 23. The free end terminates in a curved end that is aligned with the extreme end of the second engagement formation 24, and which matches the profile of the extremity of the second engagement formation 24. The connection zone 26.1 of the cantilever extension 26 is located further back towards the proximal zone of the second leg 23 compared to the second connecting formations 24, resulting in greater resilience, the purpose of which will become apparent when the operating principle of the clip 10 is discussed in more detail below.

Figure 6:
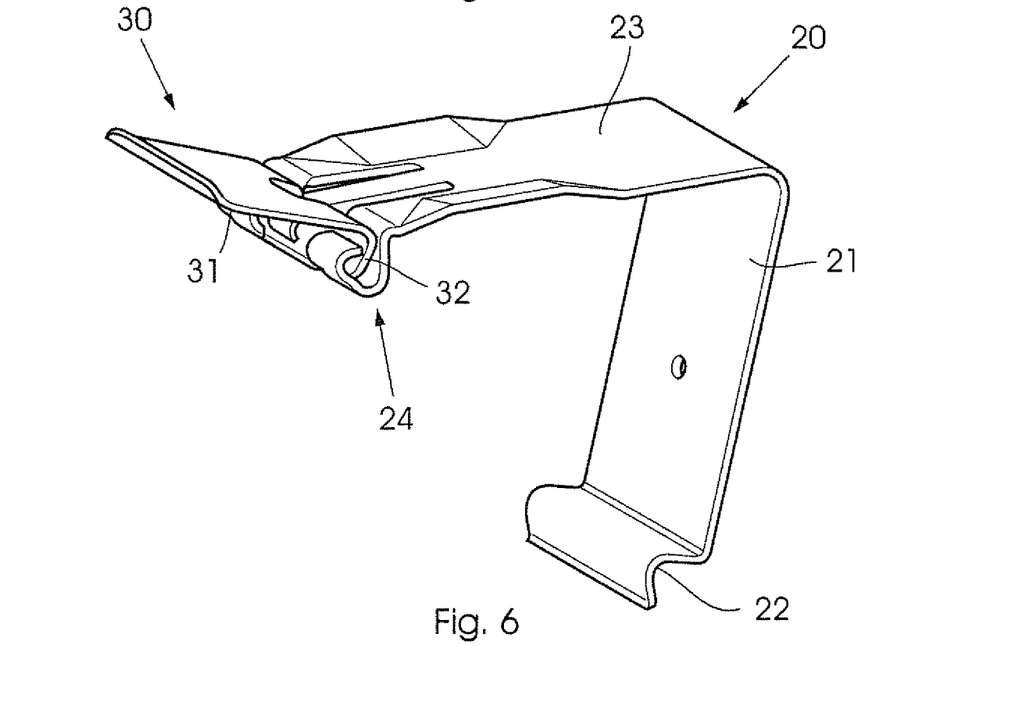
FIG. 6 shows the clip of FIG. 5 with the disengagement member in a release position.
Figure 9:
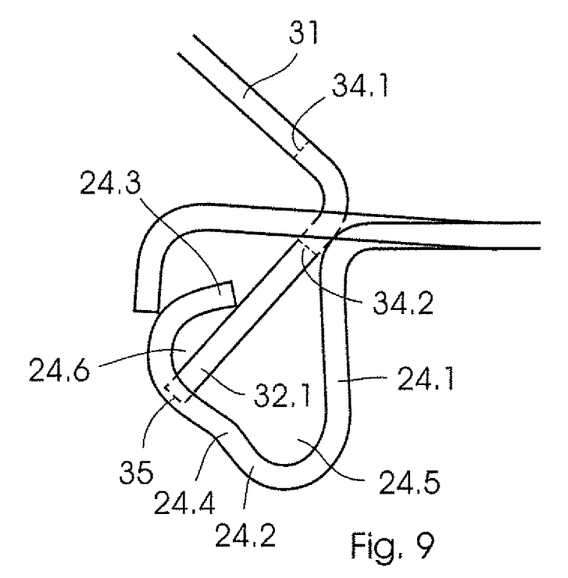
FIG. 9 is a side view of a part of the clip of FIG. 6.

In the embodiment shown in FIGS. 3 to 10, the disengagement member 30 is in the form of a planar strip of metal that has been formed into a substantially L-shaped lever, and includes a handle section 31 and an actuating section 32 that are disposed at an acute angle relative to the handle section 31. The transitional zone or corner formed between the handle section 31 and the actuating section 32 in use defines a pivot zone 33 as is explained in more detail below. The actuating section 32 terminates in a free end 32.1 which is configured to engage the lip formation 24.3 of the second engagement formation 24 when the disengagement member 30 is in the release position (FIGS. 6 and 9). A flange 35 extends from the free end 32.1, with the width of the flange being smaller than the width of the free end 32.1. More particularly, the flange 35 is configured and dimensioned to fit inside the gap 27 formed between the two second connecting formations 24 in order to prevent sideways displacement of the disengagement member 30 relative to the body 20 of the clip 10. Angular displacement of the flange 35 relative to the second connecting formations 24 is limited by the shoulder formations 25, which prevents further movement of the disengagement member 30 when ends 35.1 of the flange 35 abuts the abutment surface 25.2 of the shoulder formations 25.

An elongate slot 34 is provided in the body of the disengagement member, and extends from the actuating section 32 into the handle section 31. The slot includes a first edge 34.1 on the handle side of the disengagement member 30 and a second end 34.2 on the actuating side of the disengagement member 30. The slot is configured and dimensioned for receiving the cantilever extension therethrough.

In use, the releasable clip 10 is assembled by locating the disengagement member 30 on the clip body 20. The resilient cantilever extension 26 protrudes through the slot 34 provided in the disengagement member 30, and in use will keep the disengagement member pivotably connected to the clip body 20. More particularly, the disengagement member 30 will be able to be displaced relative to the cantilever extension 26, and hence the clip body 20, due to the provision of the slot 24 in the disengagement member 30. The cantilever extension 26 will, however, keep the disengagement member 30 in an operatively linked configuration relative to the body 20 of the clip 10, and will also exert stabilizing forces on the disengagement member 30 when the disengagement member 30 is in the rest, release or stowage positions.

The fact that the cantilever extension 26 protrudes through the disengagement member 30 limits the degree of sideways movement between the disengagement member 30 and the clip body 20. However, the sideways movement is further limited, and the stability of the disengagement member relative the clip body improved, by the flange 35 extending from the free end 32.1 of the actuating section 32 of the disengagement member 35 extending into the gap 27 between the two spaced apart second connecting formations 24. The flange 35 fits snugly, but slideably, inside the gap, and remains in the gap 27 at all the different positions of the displacement member 30 relative to the clip body 20.

Another mode of potential accidental disengagement would be excessive rotational displacement of the disengagement member 30 beyond the stowage position. If the disengagement member 30 is rotated beyond the stowage position shown in FIG. 10, the disengagement member may become dislodged, and for this reason the two opposing shoulder formations 25 are provided, which will in use arrest the end zones 35.1 of the flange 35 extending from the disengagement member, in so doing preventing further displacement of the disengagement member 30 relative to the clip body 20.

Figure 7:
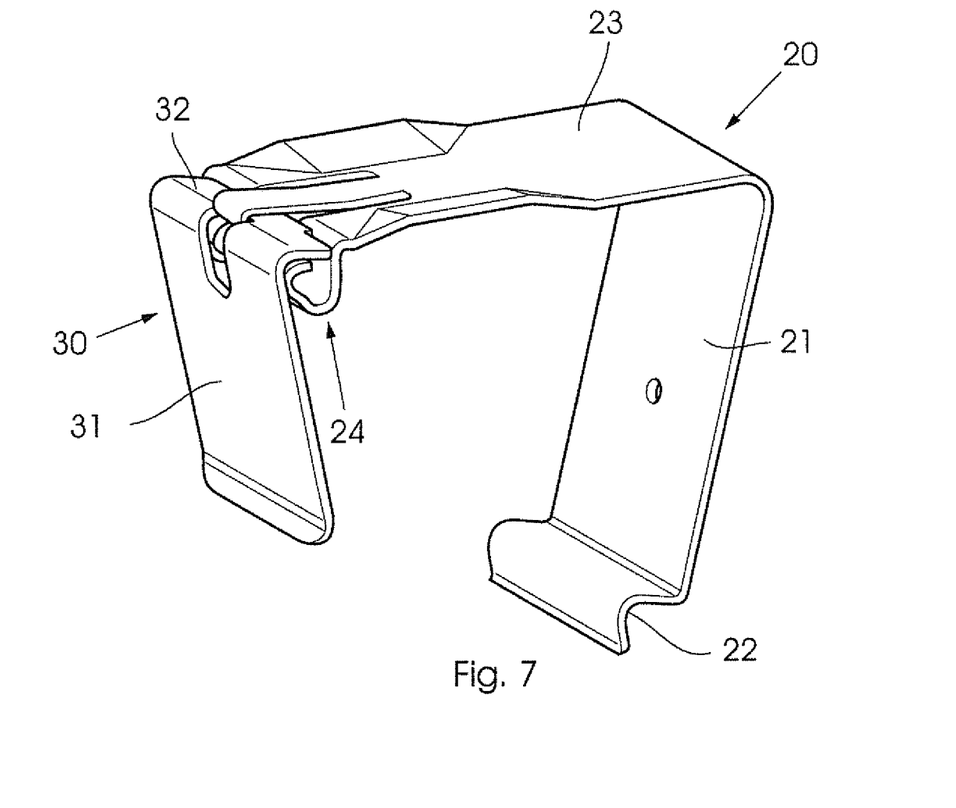
FIG. 7 shows the clip of FIG. 5 with the disengagement member in a stowage position.
Figure 8:
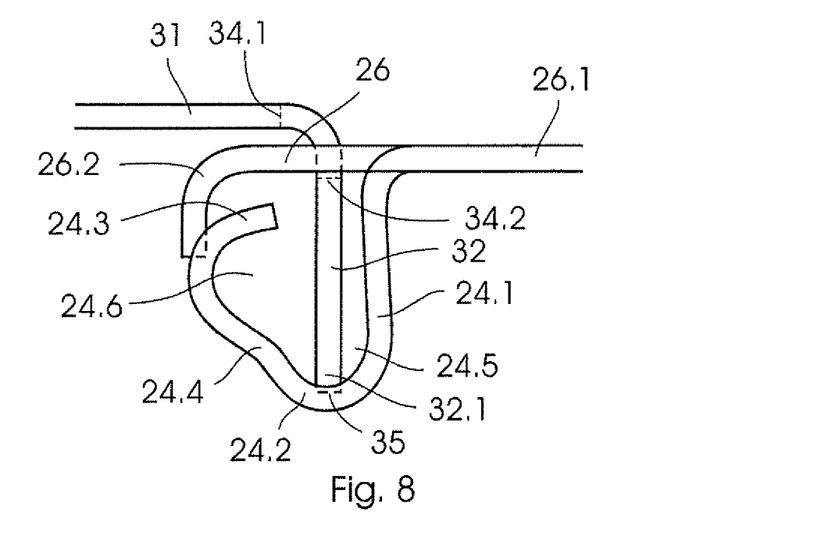
FIG. 8 is a side view of a part of the clip of FIG. 5.
Figure 10:
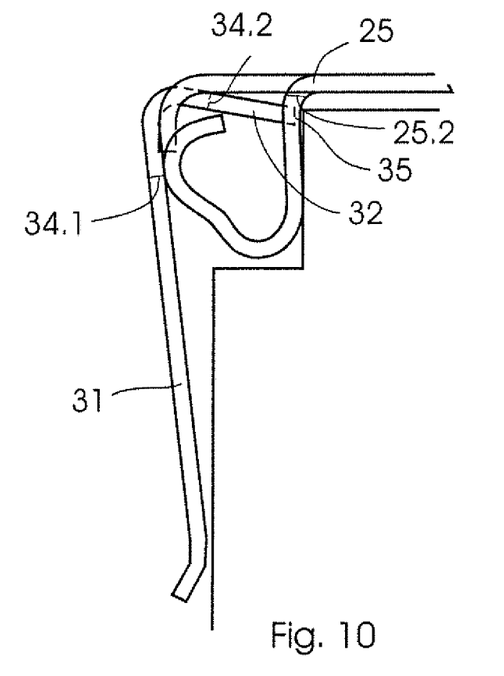
FIG. 10 is a side view of a part of the clip of FIG. 7.

The cantilevered extension 26 also plays an important part in retaining the cantilever extension in a selected position. In the rest position of FIGS. 5 and 8 the cantilever extension 26 exerts a downwardly directed force onto the second edge 34.2 of the slot 34, and therefore urges the actuating section 32 of the disengagement member 30 to stay in the first pocket 24.5 of the second connecting formation 24. At least some effort will therefore be required to displace the disengagement member 30 to either the release position (FIGS. 6 and 9) or the stowage position (FIGS. 7 and 10). Likewise, when the disengagement is in the release position as shown in FIGS. 6 and 9, the cantilever extension 26 exerts a downwardly directed force onto an inner side of the second edge 34.2 of the slot 34 of the now over centered disengagement member 30, and urges the actuating section 32 of the disengagement member 30 to stay in the second pocket 24.6 of the second connecting formation 24. Further displacement of the handle section 31 will cause the actuating section 32 to engage, and eventually displace, the lip formation 24.3 of the second connecting formation, but such further displacement will actually be done against a bias exerted by the cantilever extension 26 on the disengagement member 30. Displacement of the disengagement member 30 between the release and rest positions will also be impeded, and as such regulated, by the provision of the indentation 24.4, and hence the two pockets (24.5 and 24.6).

When the disengagement is in the stowage position as shown in FIGS. 7 and 10, the cantilever extension 26 exerts a downwardly directed force onto an outer side of the second edge 34.2 of the slot 34 of the disengagement member, and the disengagements member 30 is retained in a position in which the handle section 31 is substantially perpendicular relative to the second leg 32. In this position the handle section will overlie, and at least to some extent exert a clamping force, on an upper panel of a stack of panels during the transportation of the container in a folded, stacked configuration as is known in the art. At the very least, the handle section of the disengagement member will not stand proud of the clip 10, and will therefore not be at risk of being damaged or broken off during transportation of the collapsed container.

In use, the clip 10 will be secured to panels making up the collapsible container in the usual manner. Once the clips have been secured, and the container erected, the disengagement member 30 of each clip10 will be in the rest position, and will be substantially flush relative to the panels of the container. Only when the container is to be opened and/or disassembled will the disengagement member 30 be displaced, against the initial bias exerted by the cantilever extension 26, to the release position. In the release position, the actuating section 32 of the disengagement member 30 will abut (or nearly abut) the lip formation 24.3 on the second connecting formation 24 without actually exerting a releasing force at this time. The disengagement member 30 is, however, now primed to exert an opening force on the second connecting formation, which will then happen when a further force is exerted on the handle section 31. A pivot zone 33 of the disengagement member 30 will abut the corner 23.5 defined by the transition between the second leg 23 and the second connecting formation 24, and will act as a fulcrum for the disengagement member 30. A force exerted on the handle section 31 will therefore be amplified and transferred to the actuating section 32, which will result in the lip formation 24.3 being displaced, and for the second connecting formation 24 to be released from the securing groove in which it is located. More particularly, the lip formation 24.3 will be displaced operatively outwardly, and will result in the first part 24.1 of the second engagement formation 24 to be displaced away from the surface of the groove in the panel that it engages.

The inventor believes that the new, improved clip will be useful in that it will enable the removal of a clip without the use of any additional external tools, without the disengagement member becoming a hindrance when the clip is in the rest or stowage positions. Also, the clip will be stable in that the disengagement member will be biased to stay in a selected position, without inadvertently moving from one to the other.

It should be appreciated that the use of the clip is by no means limited to the field of collapsible or knock-down containers. The clip can be used with any application where there is a need releasably to secure panels to one another, for example furniture, partitioning and other knock-down building structures.

It will be appreciated that the above is only one embodiment of the invention and that there may be many variations without departing from the spirit and/or the scope of the invention.

The invention claimed is:

1. A releasable clip, suitable for securing two panels of a knock-down structure to one another, wherein each of the panels has an engagement slot, the releasable clip including:
   two legs extending away from one another,
   the legs being connected at one end, with each of the legs having an opposite free end that terminates in a panel engagement formation;
   wherein the clip includes a disengagement member that is pivotably connected to at least one of the legs, the disengagement member being pivotably displaceable relative to at least one of the legs between a rest position in which it does not interfere with the engagement formation provided on the leg, and a release position in which the disengagement member is arranged to be able to exert a release force on the engagement formation of the leg;
   wherein the disengagement member includes a handle section and an actuating section, with the actuating section located at least partially inside the engagement formation so as to be able in use to exert the release force on the engagement formation; and
   wherein each of the engagement formations has a protruding jaw extending inwardly from the free end of each of the legs and each of the jaws is adapted to engage the engagement slot within one of the two panels.

2. The releasable clip of claim 1, wherein the disengagement member is adapted to exert the release force on the engagement formation when the disengagement member is displaced further away from the rest position while in the release position.

3. The releasable clip of claim 2, wherein the disengagement member is in a form of a lever arrangement, with a part of the leg to which it is connected forming a fulcrum of the lever arrangement, and with the engagement formation being a load displaced by the lever arrangement.

4. The releasable clip of claim 3, wherein the disengagement member is pivotably displaceable between the rest and release positions.

5. The releasable clip of claim 3, wherein the disengagement member includes the handle section and the actuating section, with a pivot zone located between the handle section and the actuating section.

6. The releasable clip of claim 5, wherein the pivot zone, when the disengagement member is in the release position, abuts the part of the leg that forms the fulcrum of the lever arrangement.

7. The releasable clip of claim 6, wherein the pivot zone, when the disengagement member is in the release position, abuts a corner formed between the end of the leg and the engagement formation extending therefrom.

8. The releasable clip of claim 1, wherein the disengagement member is displaceable towards a stowage position, in which the disengagement member is positioned in an orientation substantially perpendicular to the leg to which it is connected.

9. The releasable clip of claim 1, wherein the engagement formation is defined by the free end of the leg to which the disengagement member is connected having been formed into a continuous, arcuate gripping formation;
   the engagement formation including a first part that extends transversely from the leg, a second part that is bent at an acute angle relative to the first part of the gripping formation, and a third part which extends transversely from the second part of the engagement formation;
   wherein a proximal zone of the second part of the gripping formation is inwardly bent towards a pocket so as to divide the pocket into a first pocket and a second pocket; and
   wherein the actuating section of the disengagement member is located inside one of the pockets defined by the engagement formation.

10. A knock-down structure including:
   at least two panels located adjacent one another, each of the panels including a securing groove provided in an edge zone thereof; and
   a releasable clip, comprising:
      two legs extending away from one another, the two legs being resiliently connected to one another at one end in order for the legs to be resiliently displaceable relative to one another;
      each of the legs having a free end, with the free ends terminating in panel engagement formations suitable for engaging the securing grooves in the panels;
      a disengagement member which is pivotably connected to at least one of the legs, the disengagement member being pivotably displaceable relative to said leg between a rest position in which it does not interfere with the engagement formation provided on the leg, and a release position in which the disengagement member is arranged to be able to exert a release force on the engagement formation of the leg in order for the engagement formation to disengage the securing groove provided in the panel; and
      wherein the disengagement member includes a handle section and an actuating section, with the actuating section located at least partially inside the engagement formation so as to be able in use to exert the release force on the engagement formation.

11. A method of removing a releasable clip from a panel of a knock-down structure, including the steps of:
   providing the releasable clip including
      two legs extending away from one another, the two legs being resiliently connected to one another at one end in order for the legs to be resiliently displaceable relative to one another; each of the legs having a free end, with the free ends terminating in panel engagement formations; and
      a disengagement member which is pivotably connected to at least one of the legs, the disengagement member being pivotably displaceable relative to said leg between a rest position in which it does not interfere with the engagement formation provided on the leg, and a release position in which the disengagement member is arranged to be able to exert a release force on the engagement formation of the leg;
      wherein the disengagement member includes a handle section and an actuating section, with the actuating section located at least partially inside the engagement formation so as to be able in use to exert the release force on the engagement formation; and
   displacing the disengagement member until it exerts the release force on the engagement formation, in order for the engagement formation to disengage a securing groove provided in the panel of a collapsible container.

12. The method of claim 11, wherein the disengagement member is first displaced from the rest position to the release position, and wherein further displacement from the release position then results in the release force being exerted on the engagement formation.

13. The method of claim 11, wherein the knock-down structure is the collapsible container.

* * * * *